(12) United States Patent
Ueda et al.

(10) Patent No.: US 7,920,903 B2
(45) Date of Patent: Apr. 5, 2011

(54) MICROPHONE TECHNIQUES

(75) Inventors: Joji Ueda, Cambridge, MA (US); David Kleinschmidt, Natick, MA (US)

(73) Assignee: Bose Corporation, Framingham, MA (US)

( * ) Notice: Subject to any disclaimer, the term of this patent is extended or adjusted under 35 U.S.C. 154(b) by 646 days.

(21) Appl. No.: 11/619,992

(22) Filed: Jan. 4, 2007

(65) Prior Publication Data

US 2008/0167092 A1    Jul. 10, 2008

(51) Int. Cl.
*H04N 1/00* (2006.01)
(52) U.S. Cl. ............... 455/575.1; 455/569.1; 455/575.2
(58) Field of Classification Search .......... 455/41.1–41.3, 455/569.1, 569.2, 575.2
See application file for complete search history.

(56) References Cited

U.S. PATENT DOCUMENTS

| | | | |
|---|---|---|---|
| 5,604,813 A | 2/1997 | Evans et al. | |
| 5,765,134 A * | 6/1998 | Kehoe | 704/270 |
| 5,787,180 A | 7/1998 | Hall et al. | |
| 5,825,897 A | 10/1998 | Andrea et al. | |
| 5,951,141 A | 9/1999 | Bradley | |
| 5,978,689 A | 11/1999 | Tuoriniemi et al. | |
| 5,991,637 A | 11/1999 | Mack, II et al. | |
| 6,061,456 A | 5/2000 | Andrea et al. | |
| 6,108,415 A | 8/2000 | Andrea | |
| 6,415,034 B1 | 7/2002 | Hietanen | |
| 6,445,799 B1 * | 9/2002 | Taenzer et al. | 381/71.6 |
| 6,507,650 B1 | 1/2003 | Moquin | |
| 6,735,316 B1 | 5/2004 | Wurtz | |
| 6,873,862 B2 | 3/2005 | Reshefsky | |
| 6,975,984 B2 | 12/2005 | MacAuslan et al. | |
| 7,058,182 B2 * | 6/2006 | Kates | 381/60 |
| 7,110,800 B2 * | 9/2006 | Nagayasu et al. | 455/575.2 |
| 7,155,214 B2 | 12/2006 | Struthers et al. | |
| 7,181,233 B2 | 2/2007 | Fry | |
| 7,187,948 B2 | 3/2007 | Alden | |
| 7,190,797 B1 | 3/2007 | Johnston et al. | |
| 7,215,766 B2 * | 5/2007 | Wurtz | 379/430 |
| 7,251,332 B2 | 7/2007 | Eves | |
| 7,254,420 B1 | 8/2007 | Klein | |
| 7,292,880 B2 | 11/2007 | Lehtonen | |
| 7,346,176 B1 | 3/2008 | Bernardi et al. | |
| 7,395,090 B2 | 7/2008 | Alden | |
| 7,433,715 B2 | 10/2008 | Buckley et al. | |
| 7,720,232 B2 * | 5/2010 | Oxford | 381/66 |
| 2001/0050991 A1 | 12/2001 | Eves | |
| 2001/0050993 A1 | 12/2001 | Douglas | |
| 2001/0053228 A1 | 12/2001 | Jones | |
| 2002/0003889 A1 | 1/2002 | Fischer | |
| 2002/0102005 A1 | 8/2002 | Lin | |

(Continued)

FOREIGN PATENT DOCUMENTS

DE    20 2006 004625    6/2006

(Continued)

OTHER PUBLICATIONS

International Preliminary Report on Patentability dated Mar. 19, 2009 for Appl. No. PCT/US08/050216.

(Continued)

*Primary Examiner* — Simon D Nguyen (57) ABSTRACT

Among other features, a boom microphone has a microphone connector; an earcup module includes an earcup connector jack to connect to a headphone and a boom lead-in to receive the microphone connector; and a control module communicates voice signals wirelessly between (a) the boom microphone and headphone and (b) a telephone.

10 Claims, 7 Drawing Sheets

U.S. PATENT DOCUMENTS

| | | |
|---|---|---|
| 2004/0136522 A1 | 7/2004 | Wurtz |
| 2004/0198436 A1 | 10/2004 | Alden |
| 2004/0204185 A1 | 10/2004 | Snyder et al. |
| 2005/0004796 A1 | 1/2005 | Trump et al. |
| 2005/0064915 A1 | 3/2005 | Lair |
| 2005/0090295 A1 | 4/2005 | Ali et al. |
| 2005/0130697 A1 | 6/2005 | Dyer |
| 2005/0146227 A1 | 7/2005 | Jackson et al. |
| 2005/0177365 A1 | 8/2005 | Ikeda |
| 2005/0181826 A1 | 8/2005 | Yueh |
| 2005/0239434 A1 | 10/2005 | Marlowe |
| 2005/2023244 | 10/2005 | Kung |
| 2006/0013410 A1 | 1/2006 | Wurtz |
| 2006/0046656 A1 | 3/2006 | Yang |
| 2006/0046778 A1 | 3/2006 | Hembree |
| 2006/0134959 A1 | 6/2006 | Ellenbogen |
| 2006/0166705 A1 | 7/2006 | Seshadri et al. |
| 2006/0193479 A1 | 8/2006 | Harvey et al. |
| 2007/0015486 A1 | 1/2007 | Marlowe |
| 2007/0025561 A1 | 2/2007 | Gauger et al. |
| 2007/0036384 A1 | 2/2007 | Struthers et al. |
| 2007/0041582 A1 | 2/2007 | Lam |
| 2007/0082612 A1 | 4/2007 | Valve et al. |
| 2007/0127747 A1* | 6/2007 | Doyle ............................ 381/309 |
| 2007/0184881 A1* | 8/2007 | Wahl et al. ................. 455/575.2 |
| 2007/0225035 A1 | 9/2007 | Gauger et al. |
| 2007/0226384 A1 | 9/2007 | Robbin et al. |
| 2007/0239849 A1 | 10/2007 | Robbin et al. |
| 2007/0247794 A1 | 10/2007 | Jaffe et al. |
| 2007/0291953 A1* | 12/2007 | Ngia et al. .................... 381/71.6 |
| 2008/0032752 A1* | 2/2008 | Tamura ....................... 455/569.1 |
| 2008/0101638 A1* | 5/2008 | Ziller ............................ 381/334 |
| 2008/0167092 A1 | 7/2008 | Ueda et al. |
| 2008/0187160 A1* | 8/2008 | Kim .............................. 381/375 |
| 2008/0201138 A1 | 8/2008 | Visser et al. |

FOREIGN PATENT DOCUMENTS

| | | |
|---|---|---|
| EP | 0 583 900 | 2/1994 |
| EP | 10915431 | 4/2001 |
| EP | 1 608 202 | 12/2005 |
| GB | 2 272 129 A | 5/1994 |
| GB | 2343080 A | 4/2000 |
| JP | 2000224683 | 8/2000 |
| JP | 2001016679 A | 1/2001 |
| JP | 2001100794 | 4/2001 |
| JP | 2001103355 | 4/2001 |
| WO | WO 00/10362 | 2/2000 |
| WO | WO 00/38044 | 6/2000 |
| WO | 0203746 | 1/2002 |
| WO | WO 02/01910 | 1/2002 |
| WO | WO 2004/080123 | 9/2004 |
| WO | WO 2005029825 | 3/2005 |
| WO | 2006130115 | 12/2006 |
| WO | WO2006/129205 | 12/2006 |
| WO | 2007031703 | 3/2007 |
| WO | 2007049075 | 5/2007 |

OTHER PUBLICATIONS

Tekkeon, myTalker Compatibility, http://www.tekkeon.com/site/products-mytalker-ompat.php, downloaded Jan. 24, 2006. Site Copyright 2004, 2005, Publication date unknown.
Tekkeon, myTalker Tech Specs, http://www.tekkeon.com/site/products-mytalker-specs.php, downloaded Jan. 24, 2006, Site Copyright 2004, 2005, Publication date unknown.
Tekkeon, myTalker Features, http:www.tekkeon.com/site/products-mytalker-features.php, downloaded Jan. 24, 2006, Site Copyright 2004, 2005, Publication date unknown.
Tekkeon, myTalker Bluetooth Gateway for iPod and MP3 Players Data Sheet, Copyright 2006, Site Copyright 2004, 2005, Publication date unknown.
Hardware Zone, Tekkeon Enables Mobile Phone Calls Using iPod/MP3 Headphones, San Francisco, MacWorld, Jan. 10, 2006. http//www.hardwarezone.com/news/view.php?id3523&cid=2&src=rss, downloaded Jan. 24, 2006.
TreoCentral.com—SkullCandy headset? pp. 1-3, http://discuss.treocentral.com/archive/index.php/t-33954.html, downloaded Nov. 3, 2005, Publication date unknown.
Amazon.com: Electronics: Skullcandy SCE-3B Skullcandy Earbud with 3-Bar . . . p. 1 of 1, http//www.amazon.com/gp/product/B00009WE3O/sr=1-18/qid=1131032711/ref=sr_1_18/102-71 . . . , downloaded Nov. 3, 2005, Publication date unknown.
Amazon.com: Electronics: Skullcandy SCE-3B Skullcandy Backphones with 3- . . . p. 1 of 2, http//www.amazon.com/gp/product/B00009WE3M/I02-7181297-1030518?v=glance&n=
172282 . . . , downloaded Nov. 3, 2005, Publication date unknown.
Kapica, J. Globeandmail.com, Skullcandy Link, Thursday, Oct. 23, 2003, Posted at 9:01 AM EST, http://www.globetechnology.com/servlet/story/RTGAM.20031021,gtskullrevoct21/BNPrint/Tech . . . , downloaded Nov. 3, 2005.
Bluetake Technology BT420, Bluetooth®, Hi-Fi Sports Headphone, Copyright 2004. www.bluetake.com., Publication date unknown.
i-PHONO BT420EX Bluetooth Hi-Fi Sports Headphone Kit, pp. 1-5, http//www.bluetake.com/products/BT420EX/BT420EX_subS.htm, downloaded Nov. 3, 2005, Publication date unknown.
BlueTake BT420ex Bluetooth Stereo Headset, pp. 1 of 2, http//www.behandsfree.com/ProductInfo.aspx?productid=WHEAD1014, downloaded Nov. 3, 2005, Publication date unknown.
Amazon.com: Electronics: Skullcandy SCE-N4 Skullcandy Earbud For Nokia; 4-Barrel 2.5 MM Pin . . . p. 1 of 1, http//www.amazon.com/gp/product/tech-data/B00009WE3P/ref=dp_nav_0/102-7181297-103051 . . . , downloaded Nov. 3, 2005, Publication date unknown.
Skullcandy, Portable Link User's Guide, pp. 1-2, http://www.skullcandy.com/manuals/LinkUserGuide.pdf, downloaded Nov. 11, 2005, Publication date unknown.
http://www.uflymike.com/index.html, pp. 1-2, Downloaded Apr. 18, 2005.
The Bose Avidation Headset X Owner's Guide, Version AM270261_00V.pdf, May 16, 2003.
The Bose QuietComfort Acoustic Noise Cancelling Headphones Guide, Version AM257565_00_V.pdf, May 13, 2003.
Combat Vehicle Crewman Headset Brochure Bose Corporation 2000.
Combat Vhicle Crewman Headset Parts List Bose Corporation 1998.
U.S. Appl. No. 11/191,873, filed Jul. 28, 2005, entitled "Electronic Interface with a Head-Mounted Device."
U.S. Appl. No. 11/390,718, filed Mar. 27, 2006, entitled "Headset Audio Accessory."
theBoom Quiet. http://www.theboom.com/ProductDetails.asp?ProductCode=571&Show=TechSpecs downloaded Jan. 3, 2007.
Creative Worldwide Headset CB2455. http://www.creative.com/products/product.asp?category=437&subcategory=442&product downloaded Jan. 3, 2006.
Plantronics Pulsar™ 590A Bluetooth® Headset. http://www.headsetgenie.com/product_info.php?cPath=8&products_id=318 downloaded Jan. 3, 2007.
International Search Report and Written Opinion in Application No. PCT/US2008/050216, dated Sep. 4, 2008.
"Bluetooth Wireless Stereo Solutions, User Manual (GBMA201, GBMH201, GBMHKIT)," IOGEAR, Copyright 2005 (retrieved on May 26, 2008), retrieved from the Internet: <URL:http://www.iogear.com/support/dm/manual/GBMH201#display>.
"Blueye Cyclops Bluetooth Stereo Headphone," Philippines Hardware Zone, Jan. 29, 2006 (retrieved on May 26, 2008), retrieved from the Internet: <URL:http://ph.hardwarezone.com/news/view.php?cid=8&id=3526>.
Invitation to Pay Additional Fees dated Jun. 6, 2008 from International Application No. PCT/US2008/050216.
International Search Report and Written Opinion dated Aug. 16, 2007 for Appl. PCT/US07/064913.
International Preliminary Report on Patentability dated Mar. 10, 2008 for Appl. No. PCT/US07/064913.
Bluetake i-Phone BT420EX Bluetooth Hi-Fi Sports Headphone Kit; BLUETAKE Bringing Enhanced enjoyment ; from website: www.bluetake.com/products/BT420EX/BT420EXsubS.htm (Nov. 3, 2005).

Anonymous, "Combining telephone capability with portable music devices", vol. 43, No. 665, Research Disclosure, Mason Publications (Mar. 2001).

Tekkeon—Cut Loose—Stay Loose: "myTalker Compatibility" from website: www.tekkon.com/site/products-mytalker-compat.php, Jan. 26, 2006.

Bluetake Technology; Bluetooth Hi-Fi Sports Headphone B2420; Bluetake Technology Co., Ltd. From website: www.bluetake.com; 2004.

Skullcandy Portable Link User's Guide; Skullcandy at 435-940-1545.

Tekkeon—Cut Loose—Stay Loose; from website: www.tekkon.com/site/products-mytalker-features-php, Jan. 26, 2006.

Globeandmail.com; Skullcandy Link by Jack Kapica, from website: www.globetechnology.com/servlet/story/RTGAM.20031021.gtskullrevoct21; Nov. 3, 2005.

Skullcandy SCB-3B Skullcandy Backphones With 3-Barrel Universal Cellphone Connector; from website: Amazon.com: Electronics: Skullcandy SCB-3B Skullcandy Backphones; Nov. 3, 2005.

Skullcandy SCE-3B Skullcandy Earbud With 3-Barrel Universal Cellphone Connector; from website: Amazon.com: Electronics: Skullcandy SCE-3B Skullcandy Earbud; Nov. 3, 2005.

Tekkeon—Cut Loose—Stay Loose; myTalker Tech Specs; from website: www.tekkeon.com/site/products-mytalker-specs.php, Jan. 24, 2006.

JP Office Action dated Jan. 26, 2010 for JP Appl. No. JPO2009-600045_000424.

JP Office Action dated Jan. 26, 2010 for JP Appl. No. JPO2009-600045_000425.

Certificate of Patent for Utility Model dated Mar. 3, 2010 for CN Patent No. ZL200890000013.7.

AU Office Action dated Jun. 1, 2010 for AU Appln. No. 2008205121.

International Preliminary Report on Patentability dated May 12, 2007 for Appl. No. PCT/US06/028605.

International Search Report and Written Opinion dated Dec. 6, 2006 for Appl. No. PCT/US06/028605.

CN Notice of Grant dated Oct. 23, 2009 for CN Appl. No. 200890000013.7.

* cited by examiner

MICROPHONE TECHNIQUES

BACKGROUND

This description relates to microphone techniques.

SUMMARY

In general, in an aspect, a boom microphone has a microphone connector; an earcup module includes an earcup connector jack to connect to a headphone and a boom lead-in to receive the microphone connector; and a control module communicates voice signals wirelessly between (a) the boom microphone and headphone and (b) a telephone.

Implementations may include one or more of the following features. The microphone connector is non-axisymmetric. There is a power connection to carry power from a power source in the headphone through the earcup connector jack to the powered circuitry. The control module is adapted to equalize the voice signals from the boom microphone. The control module is adapted to determine is the boom microphone is attached to the earcup module. The control module includes a connector adapted to carry a signal from an audio player to the headphone. The control module is adapted to automatically mute the signal from an audio player when an incoming call is received by the cell phone. The control module further includes a wireless module for managing communication with the cell phone. The wireless module includes a Bluetooth module.

In general, in an aspect, a headphone includes a power source, a microphone is attachable to the headphone, control circuitry not in the headphone controls use of audio signals associated with the microphone and the headphone, and there is a power connection between the power source of the headphone and the control circuitry.

Implementation may include one or more of the following features. The headphone includes noise canceling circuitry. The control circuitry controls audio signals used for telephone calls that are passed wirelessly to and from a telephone set. The power connection includes conductors of a cable. The power source includes a battery. The microphone includes a boom microphone. There is a connector between the microphone and the headphone.

In general, in an aspect, signals are received from a microphone, the signals being representative of a voice of a user wearing an active noise reducing headphone. The received electrical signals are processed to produce derived signals representative of the voice. The derived signals are delivered to a transducer in the headphone to be played to the user. The signal processing causes the derived signals to be natural reproductions of the user's voice as played to the user.

Implementations may include one or more of the following features. The microphone is attachable to the headphone. The signal processing includes equalization. The signal processing includes level setting. The signal processing is based on configuration information provided by the user.

In general, in an aspect, microphone signals are received that are representative of a voice of a user wearing a headphone, and the received signals are equalized in accordance with an inverse of a transfer function of sound traveling a path from the user's mouth via the headphone to an ear of the user multiplied by a transfer function of sound traveling a path from the user's mouth to the user's ear, absent the headphone.

In general, in an aspect, a shielded noises canceling microphone is attachable to and detachable from a noise canceling headphone.

Implementations may include one or more of the following features. There is a connector between the microphone and the headphone. The microphone includes a boom microphone.

In general, in an aspect, a microphone is connectable to a noise canceling headphone, and a controller separate from the microphone is connectable to the noise canceling headphone and to the microphone. The controller includes a wireless transceiver to communicate microphone and headphone signals to and from a telephone set.

In general, in an aspect, a microphone is attachable to and detachable from the headphone and adapted to draw current from a power source in the headphone. Circuitry determines the connection state of the microphone to the headphone based on detecting the drawing of current.

Implementations may include one or more of the following features. The microphone includes a noise canceling microphone. The power source includes a battery. The circuitry includes a unit that is separate from the headphone and the microphone. The circuitry disconnects a telephone call when it determines that the microphone has been disconnected.

In general, in an aspect, a microphone is attachable to and detachable from the headphone, and circuitry communications microphone and headphone signals to and from a telephone set and disconnects a telephone call in progress at the telephone set if the microphone is detached during the call.

Implementations may include one or more of the following features. The circuitry includes wireless communication circuitry to communicate the signals. The circuitry includes a unit that is separate from the microphone and the headphone. In general, in an aspect, a connector attaches a microphone to and detaches the microphone from a headphone non-axisymmetrically, and the connector is configured to cause the microphone to have the same orientation relative to the mouth after the microphone is detached to the headphone as the orientation that existed when the microphone was previously attached to the headphone.

Implementations may include one or more of the following features. An orientation of the microphone relative to the mouth of a person wearing the headphone can be adjusted using a gooseneck. The microphone comprises a boom microphone. The connector and the microphone connect non-axi-symmetrically.

In general, in an aspect, a connector attaches a microphone to and detaches the microphone from a headphone, the connector having a non-axisymmetric cross-section.

In general, in an aspect, circuitry has ports for connection to a telephone set to carry telephone audio signals, to a music source to carry music audio signals, to a headphone to play audio signals, and to a microphone to convert speech to audio signals, the circuitry being configured to detect an incoming phone call while music audio signals from the source are being played in the headphone and to switch audio signals played by the headphone from the music audio signals to the telephone audio signals.

Implementations may include one or more of the following features. The circuitry is separate from the headphone, the telephone set, the music source, the headphone, and the microphone. The connection to the telephone set is wireless.

In general, an aspect includes detecting when a microphone associated with a headphone is no longer providing voice signals for one side of a telephone call, and in response to the detecting, terminating the telephone call.

Implementations may include one or more of the following features. The detecting includes electronically determining when the microphone has been detached from the headphone. Terminating the call includes sending a hand up indication from a controller associated with the headphone. The hang up indication is sent wirelessly to a telephone set.

These and other features and aspects and combinations of them may be expressed as apparatus, methods, systems, means for performing a function, program products, and in other ways.

Other advantageous and features will become apparent from the following description and from the claims.

DESCRIPTION

Figure 1:
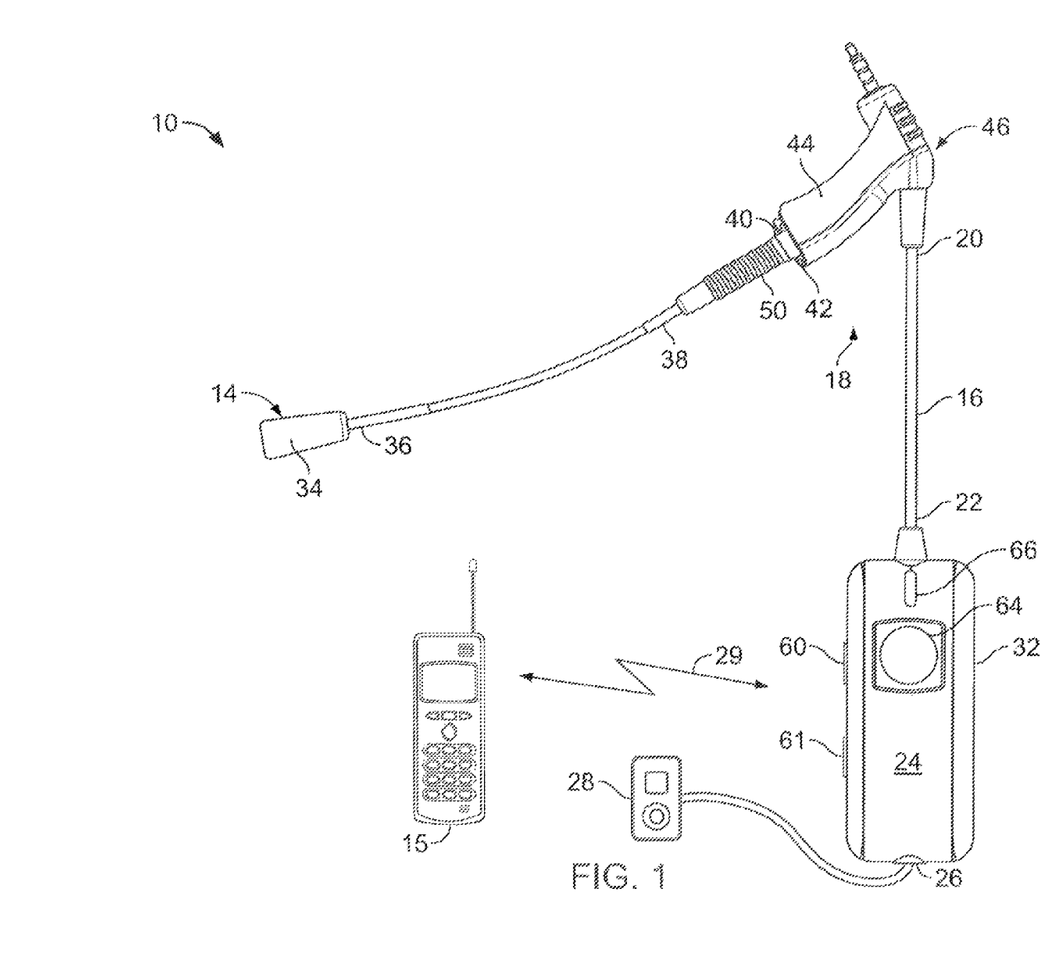
FIG. 1 is a front view of a microphone accessory.
Figure 6:
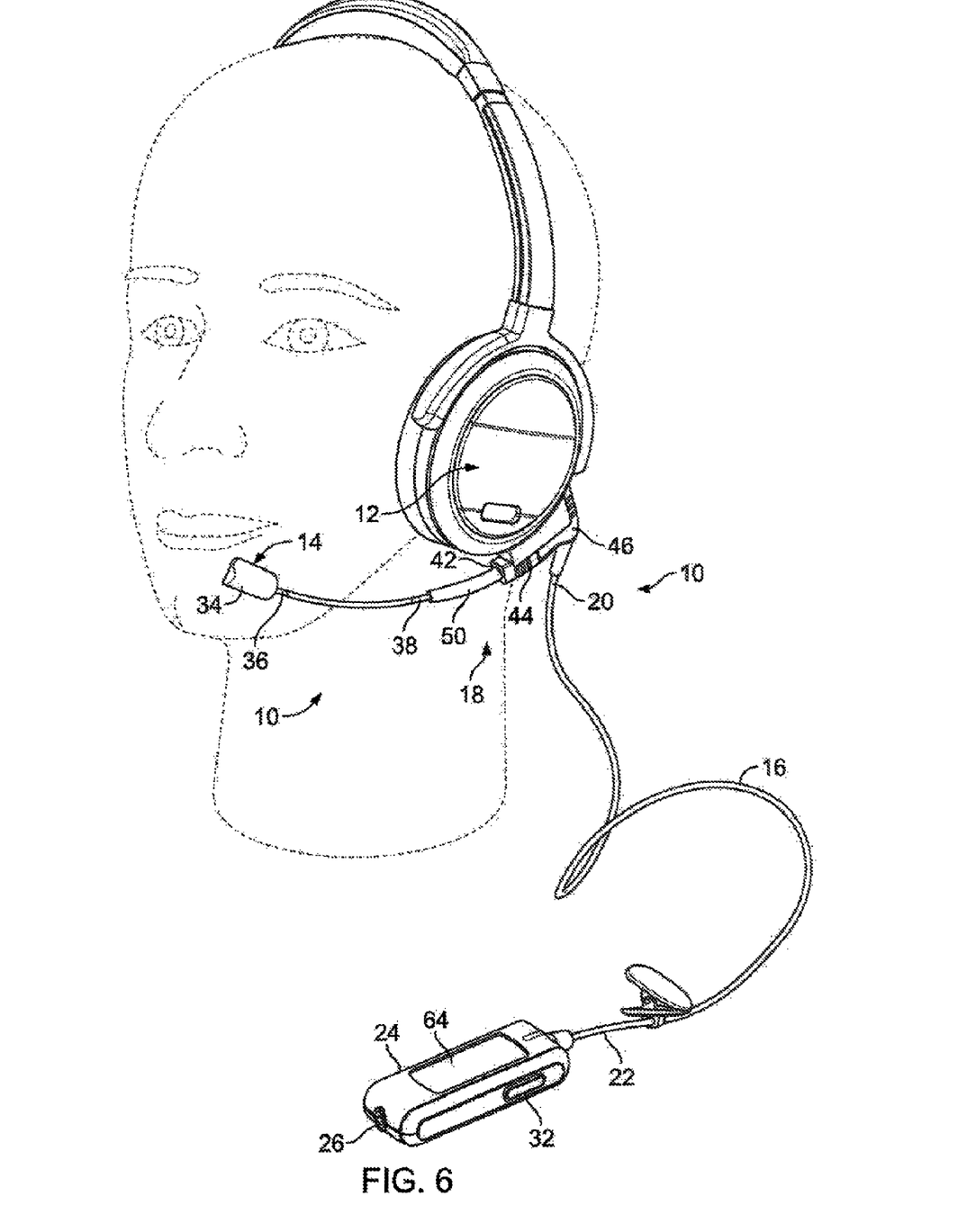
FIG. 6 is a perspective view of a dummy wearing headphones.
Figure 7:
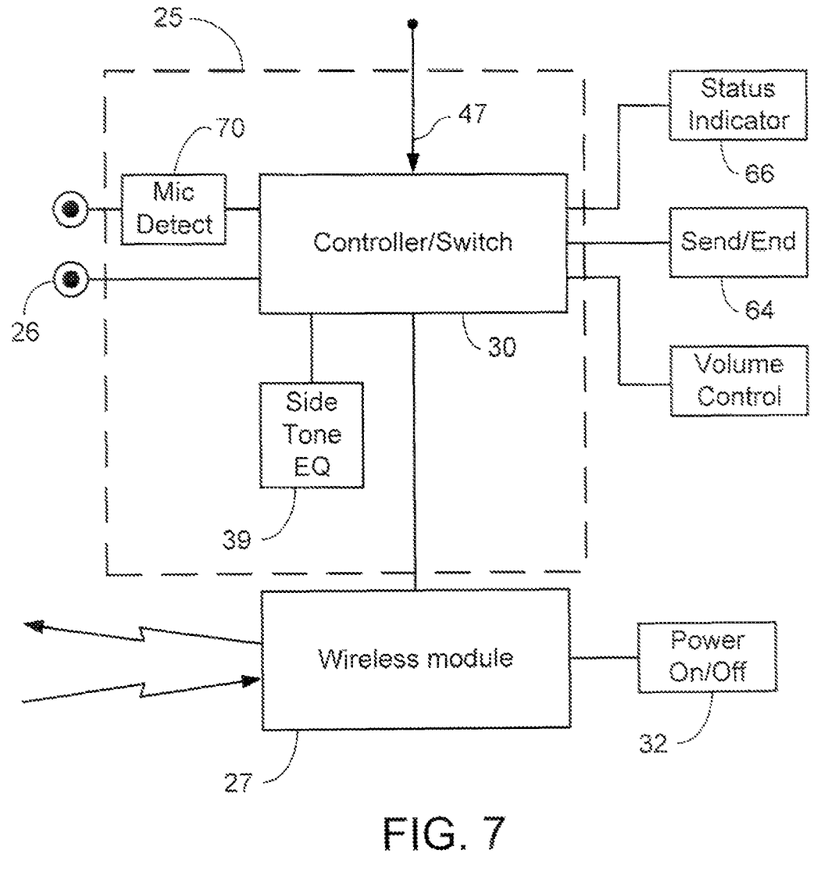
FIG. 7 is a block diagram of control module circuitry.

As shown in FIGS. 1 and 6, a microphone accessory 10 for a set of headphones 12, such as Bose Quiet Comfort 3 headphones or any other kind of active noise canceling or non-noise canceling headphone or headphones (including surrounding the ear, on the ear, or in the ear), provides Bluetooth (or other) wireless connectively of the headphones 12 and a microphone 14 to a Bluetooth (or other)-enabled cell phone 15 (not shown to scale). (We sometimes use the plural headphones to refer also to a signal headphone.) The cable (not shown) that is normally supplied with the headphones is replaced by a cable 16 heaving a detachable microphone boom assembly 18 at one end 20 and, at the other end 22, a control module 24 that houses circuitry 25 (FIG. 7) to control the use of the microphone, the headphones, and the wireless connectivity with the cell phone, among other things; a Bluetooth transceiver module 27 (FIG. 7), and an input jack 26 to receive a stereo music (or other) audio signal from a music (or other audio) source 28 (not shown to scale) such as an MP3 player, a CD player, or a radio.

The accessory 10 provides hands-free operation and use of the Bluetooth-enabled cell phone and carries audio signals between the cell phone and the headphones, even in environments that were previously considered too noisy to carry on a telephone conversation.

Circuitry in the control module includes automatic audio source switching 30 (FIG. 7) that enables the user to recognize and accept a cell phone cell without taking off the headphones. When the microphone is in use, during a phone call, for example, a side tone is provided that allows the user to hear himself talk in a natural voice even in high ambient noise environments which yields a more natural speaking experience while wearing the headphones.

The accessory is powered by the headphone's battery (not shown) through one or more power conductors 47 that are, for example, part of cable 16, thereby eliminating the need to carry another battery charger for the accessory. The accessory 10 is normally powered on whenever the headphones are turned on, provided the accessory is plugged into the headphones. A Bluetooth on/off switch 32 on the control module controls the power supplied to the Bluetooth module. The Bluetooth module can be turned off during an airline flight, for example, while still allowing stereo music to be routed from the music source through the control module to the headphones. The accessory can be stored in the headphones carrying case while attached to the headphones. The microphone 14, which in some examples is a boom microphone, can be stored in a boom holder in the headphones carrying case.

The microphone 14 is a commercial noise canceling microphone available from vendors such as Knowles Acoustics of Itasca, Ill. The length of cable 16 (which is not shown to scale in FIG. 1) is, in some examples, about 20 cm. A plastic housing 34 supporting the microphone may allow stray electrical signals to interfere with the electrical signal representing the sound received by the microphone. The microphone may be electrically shielded by inserting a grounded conductor (not shown) between the plastic housing and microphone. The grounded conductor may be disposed on the plastic housing or on the microphone and may be grounded by the ground lead from the microphone.

Figure 2:
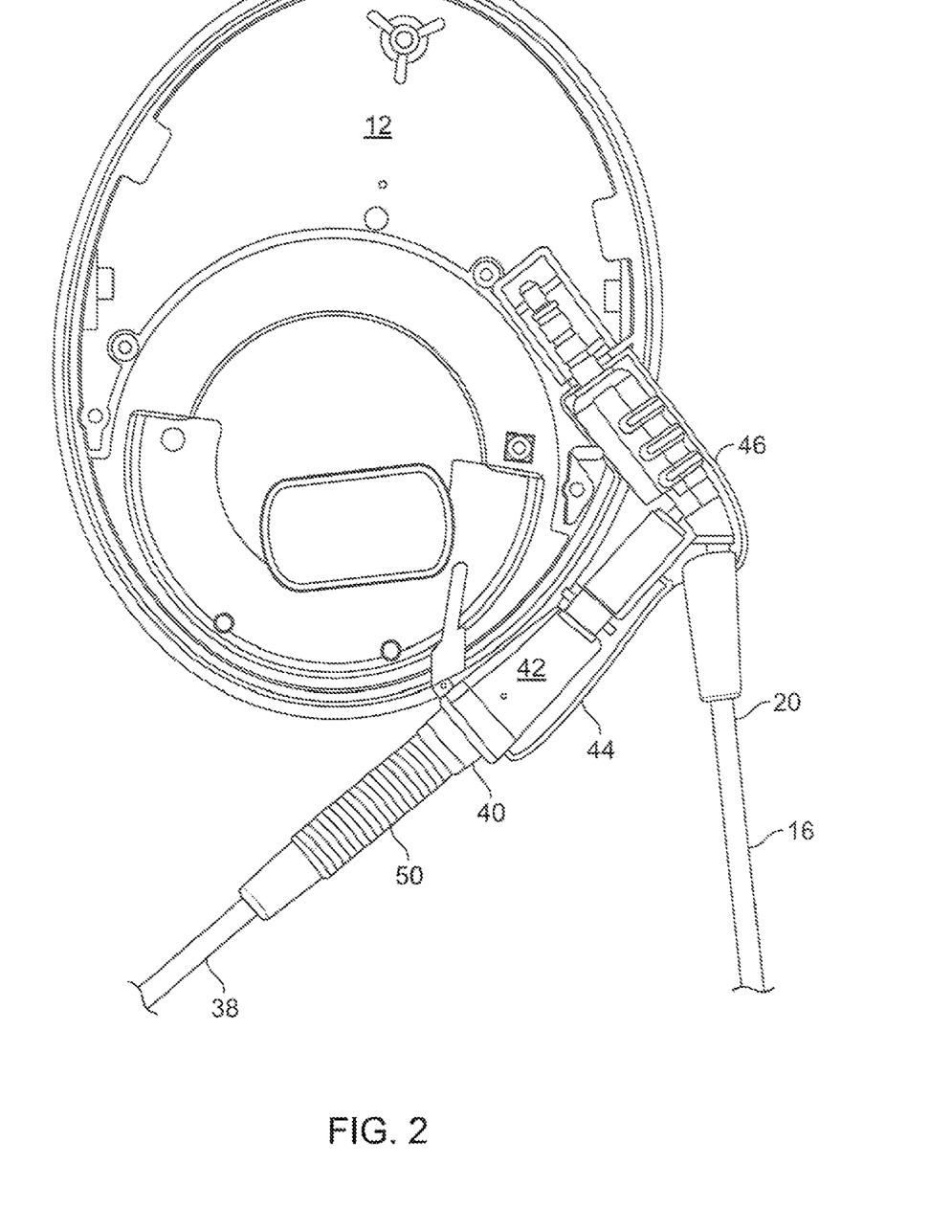
FIG. 2 is a front view, partially broken away of a microphone accessory and headphones.

The microphone 14 (which is hidden in FIG. 1) is held on one end 36 of a microphone boom 38. The other end 40 of the boom is coupled to a microphone connector 42 (which we also sometimes call a boom connector). The microphone connector 42 is seated within a lead-in receptacle 44 of an earcup module 46. For attaching and removing the boom microphone to and from the earcup module 46, the connector 42 can be guided into a lead-in receptacle 44 (FIG. 2) of the earcup module 46. The boom microphone connector is contoured (as shown in FIG. 3) to match a contoured internal wall of the earcup module lead-in to preserve the orientation and position of the microphone relative to the user's mouth when the boom microphone is detached from and reattached to the earcup module.

Figure 3:
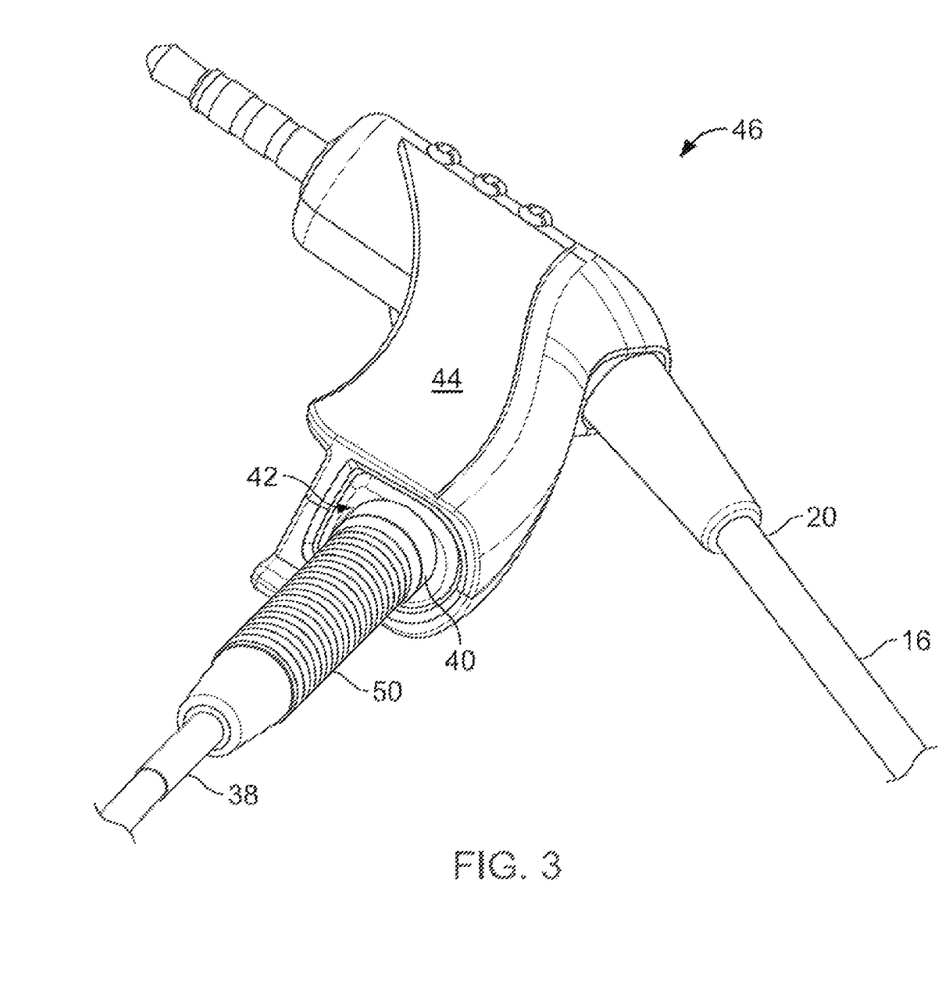
FIGS. 3 and 4 are perspective views of an earcup module.
Figure 4:
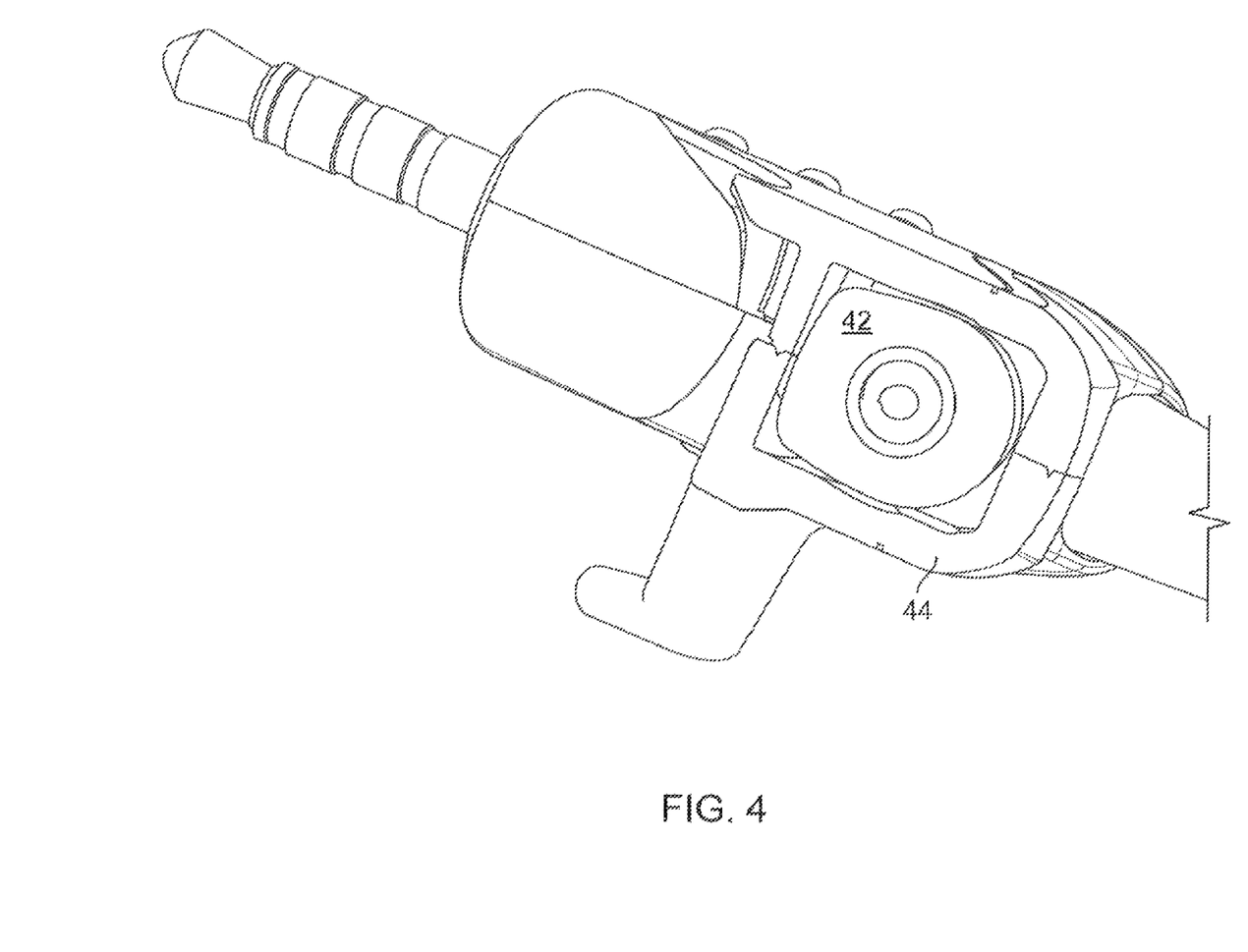

The cross-sectional contour of the microphone connector and the lead-in are non-axisymmetric around an axis that lies along the length of the microphone boom to allow the connector to fit into the boom lead-in in only one orientation, as shown in FIG. 3. The proper orientation could also be enforced by a slot-key configuration in which the key fits in the slot to prevent rotation of the key beyond the confines of the slot. The slot may be located on the boom connector or the lead-in.

A gooseneck 50 between the boom 38 and the boom connector allows the user to adjust the position and orientation of the noise canceling microphone relative to his mouth and maintains the position and orientation when the user inserts or removes the detachable boom microphone from the earcup module. The keyed microphone connector allows the user to remove the boom microphone after the has adjusted the microphone and later reattach the boom microphone with the microphone having the same, or close to the same position and orientation upon reattached.

Figure 5:
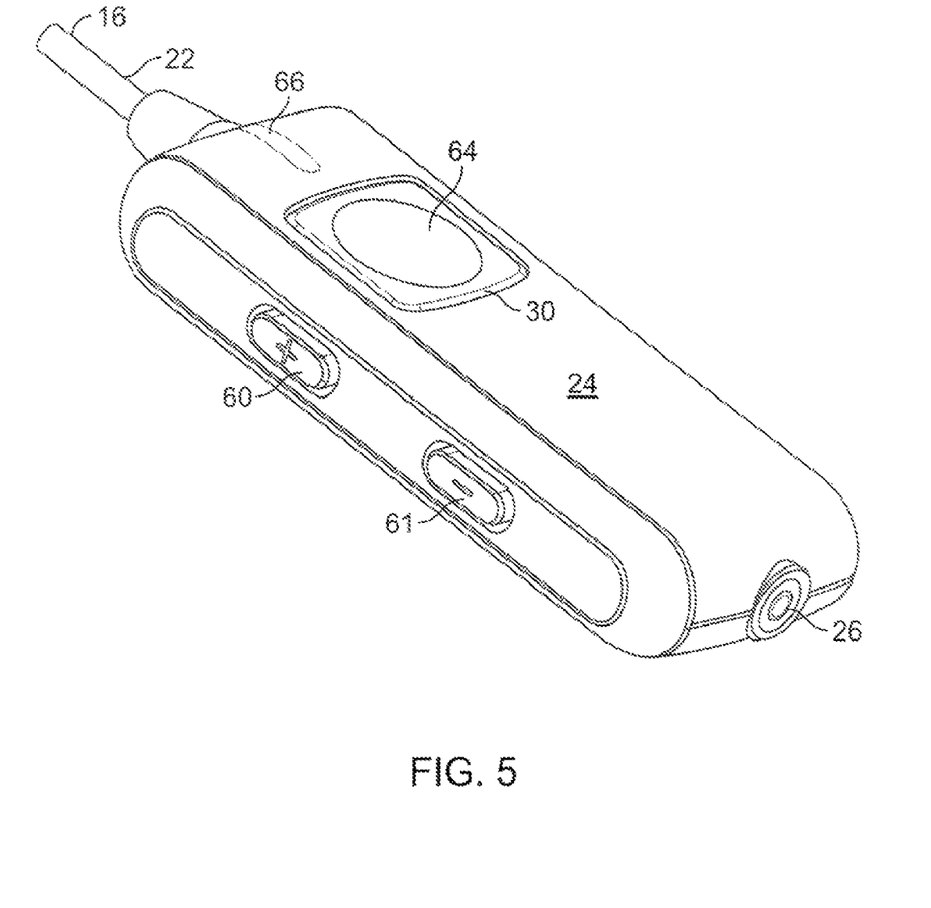
FIG. 5 is a perspective view of a control module.

The on/off switch 32 that controls power to the Bluetooth module in the control module is on the opposite side of the module from the up and down volume controls 60, 61 shown in FIG. 5. The volume controls and send/end control 64 perform different functions depending on the operating mode of the module. The mode is indicated by an indicator light 66.

One operating mode is a pairing mode in which the accessory is paired with a Bluetooth-enabled cell phone. The user enters the pairing mode by pressing the send/end button on the control module and the VOL+button simultaneously while the control module is powered on. When in the pairing mode, the indicator light is constantly lighted. Once in pairing mode, the user enters a predetermined code into his cell phone. For example, the user enters 0000 as the pairing code.

Once the paring has occurred, the Bluetooth link 29 between the control module and the call phone carries audio and control signals back and forth between the cell phone and the control module. After the call phone has been paired to the accessory, the control module enters a stand-by mode, indicated by a blink once every 3 seconds. In stand-by mode, short-pressing the send/end button activates a voice dialing mode in the cell phone, if it has such a feature, to allow the user to dial a number using voice commands through the microphone. (Otherwise the user can dial using the cell phone keypad, for example.) A short-press is a press that lasts, for example, less that 2 seconds. A long-press is one that lasts more than 2 seconds. Long-pressing the send/end button causes the last number dialed to be redialed. If the cell phone has voice dialing capability and the user enters voice dialing mode, the user can cancel voice dialing by a short-press on the send/end button. The user can also end the last number redial mode by a short-press on the send/end button.

When the control module is in stand-by mode and an incoming call is received, the appearance of the incoming call is reported by the cell phone to the control module, and the control module enters a ringing mode. If, when the incoming call appears, the user is listening to a music player connected through the music player jack, the control module alerts the user of the incoming call and allows the user to answer the incoming phone call. The control module can alert the user of the incoming call by altering the music so that the call is audible by, for example, automatically muting or pausing the music player, by lowering the level of the music, or by playing the music player in one ear while playing the call in the other ear. The user may answer the incoming call by a short-press on the send/end control or by pressing the VOL+control. The user may reject the incoming call by a long-press on the send/end control or by pressing the VOL− control. When the user rejects or ends a call, the audio program automatically is unmuted or resumed by the control module.

When the user is talking on the phone, the control module is in an active call mode indicated by a 2-second-on/5-second-off cycle by the indicator light. In the active call mode, the suer can end the call by a short-press on the send/end control or can transfer the call by a long-press on the send/end control. During a call, the user can increase or decrease the volume by pressing the VOL+ or VOL− control, respectively.

During the call, the user's voice is played back through the headphones as a side-tone. When wearing typical headphones, especially noise canceling headphones, the transfer function between the user's mouth and his ears is altered so that the user can hear only a modified version of his voice that sounds un-natural to him. In some implementations described here, the user's voice is layered back through the headphones as a side-tone so that the user hears his voice naturally as if the were not wearing the headphones. Before being played into the headphones, the side-tone may be equalized or level adjusted for both (by signal processing circuitry 39, FIG. 7, in the control module) to make the side-tone sound close to the user's natural voice so that the user does not perceive an unwanted difference compared to what the is accustomed to hearing when not wearing the headphones.

The equalization and level adjustments will depend on both the microphone and headphones. In generally, the equalizer can have a responses that is the inverse of the complete transfer function (in the frequency domain) from mouth to ear (through the electronic system including the headset), multiplied by the measured response (approximate across a large number of users) from mouth to ear through the air.

For a specific microphone and headphones combination, a variety of equalization and level settings may be tried with different users and the setting preferred by a majority of the different users may be selected. The preferred setting may be implemented as a non-adjustable equalization/level side-tone module within the control module or as a default setting in an adjustable equalization/level side-tone module within the control module. For example, a non-adjustable equalization/level side-tone module may be implemented using a fixed gain and boosting of an upper portion of a human voice range to produce a more naturally sounding side-tone. If a different microphone is used with the headphones, the side-tone module may increase or decrease the high frequency boost to compensate for the different microphone.

The side-tone can mimic the level, variability, frequency, or other characteristic of the attenuation imposed by the headset. Among other things, low frequency response can be adjusted to compensate for the bass boost that characterizes typical noise canceling microphones when they are located close to the speaker's mouth and for equalization that has been configured for music reproduction.

Providing a side-tone equalized as described can also be useful in circumstances other than during a phone call, including having a normal live conversation with another person. The user may end a call by pressing the send/end button or by detaching the boom microphone from the earcup module. The control module monitors the signal from the boom microphone and when the signal drops below a predetermined threshold, the control module assumes that the boom microphone has been detached. The control module may also detect (by microphone detection circuitry 70, FIG. 7, in the control module) the detachment of the boom microphone by monitoring a current draw (or a voltage change across a bias resistor) that powers the microphone. When the control module detects boom microphone detachment, the control module hangs up the call by sending a hang up indication to the cell phone and places the Bluetooth module into the standby mode. Conversely, when the microphone is attached and an incoming call is received, the control module may automatically answer the call and allow the user to start talking.

In some embodiments, the user may simply detach the microphone during a teleconference to just listen to the teleconference. This "listen only" feature may also be implemented by a separate switch or control on the control module. This feature may be useful when the user is in a noisy environment and needs only to listen to the teleconference.

Other implantations are also within the scope of the claims.

For example, some embodiments include placing some or all of the control module circuitry in the earcup module and providing controls on the earcup module. boom microphone, or on a remote control. Some embodiments include placing the control module circuitry within the earcup of the headphones.

The circuitry used to implement the features described above is straightforward. The Bluetooth module, for example, is a standard Bluetooth module that can be purchased by various vendors such as, for example, Samsung Micro Electronics Corporation. Although Bluetooth protocol is used as the wireless protocol, other short-range wireless protocols may be used.

Additional information about electronic interfacing with a head-mounted device, and headset audio accessories is set forth in U.S. patent application Ser. No. 11/191,873, filed Jul. 28, 2005, and Ser. No. 11/390,718, filed Mar. 27, 2006, which are incorporated here by reference in their entireties.

What is claimed is:
1. A method comprising:
receiving from a microphone of an active noise reducing headphone signals representative of a voice of a user wearing the headphone, wherein the microphone is disposed on the headphone in a manner placing the microphone in proximity to the mouth of the user;
signal processing with a control module of the active noise reducing headphone the received signals to produce derived signals representative of the voice;

delivering the derived signals to a transducer in the headphone to be played to the user; and wherein the signal processing comprises at least a partial inverse of the transfer function of the user's voice from the user's mouth to an ear of the user that results from the user wearing the headphone such that the signal processing causes the derived signals to be more natural reproductions of the user's voice as played to the ear of the user by the transducer.

2. The method of claim 1 in which the signal processing includes equalization.

3. The method of claim 1 in which the signal processing includes level setting.

4. The method of claim 1 in which the signal processing is based on configuration information provided by the user.

5. The method of claim 1, wherein the headphone comprises an earcup module, and wherein the earcup module is positioned in one of a set of possible positions relative to the ear of the user, the set consisting of surrounding the ear, on the ear and in the ear.

6. The method of claim 1, further comprising:

receiving from the microphone additional signals representing another voice of a person other than the user;

signal processing with the control module the additional signals to produce additional derived signals representative of the another voice;

delivering the additional derived signals to the transducer to be played to the user; and wherein the signal processing of the additional signals representative the another voice is substantially identical to the signal processing of the received signals representative of the voice.

7. The method of claim 1, wherein the microphone is carried on a boom to position the microphone in proximity to the mouth of the user.

8. The method of claim 7 in which the microphone boom is detachable from the headphone.

9. The method of claim 1, in which the signal processing comprises boosting an upper portion of a human voice range of frequencies.

10. The method of claim 1, in which the signal processing comprises adjusting low frequency response to compensate for bass boost where the microphone is a noise canceling microphone.

* * * * *